US007832259B2

(12) United States Patent
Wang et al.

(10) Patent No.: US 7,832,259 B2
(45) Date of Patent: Nov. 16, 2010

(54) FUEL SYSTEM DIAGNOSTICS BY ANALYZING ENGINE CRANKSHAFT SPEED SIGNAL

(75) Inventors: Yue-Yun Wang, Troy, MI (US); Ibrahim Haskara, Macomb, MI (US); Chol-Bum M Kweon, Rochester, MI (US); Frederic Anton Matekunas, Troy, MI (US); Paul Anthony Battiston, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 359 days.

(21) Appl. No.: 12/139,782

(22) Filed: Jun. 16, 2008

(65) Prior Publication Data

US 2009/0312932 A1 Dec. 17, 2009

(51) Int. Cl.
*G01M 15/06* (2006.01)

(52) U.S. Cl. ................................ 73/114.25; 73/114.27

(58) Field of Classification Search .............. 73/114.02, 73/114.04, 114.05, 114.24, 114.25, 114.26, 73/114.27, 114.28

See application file for complete search history.

(56) References Cited

U.S. PATENT DOCUMENTS

| | | | | |
|---|---|---|---|---|
| 5,331,848 | A | 7/1994 | Nakagawa et al. | |
| 6,761,148 | B2 | 7/2004 | Kiessling | |
| 6,866,024 | B2 | 3/2005 | Rizzoni et al. | |
| 7,136,739 | B2 | 11/2006 | Miyata et al. | |
| 7,475,682 | B2 * | 1/2009 | Galtier et al. | 123/612 |
| 7,761,223 | B2 * | 7/2010 | Wang et al. | 701/114 |
| 2003/0010101 | A1 * | 1/2003 | Zur Loye et al. | 73/116 |
| 2009/0312941 | A1 * | 12/2009 | Wang et al. | 701/114 |

FOREIGN PATENT DOCUMENTS

EP 1705357 A1 9/2006

* cited by examiner

*Primary Examiner*—Eric S McCall

(57) ABSTRACT

Combustion within an internal combustion engine is diagnosed and includes monitoring crankshaft angular velocity and generating a combustion phasing value for a combustion chamber based on the crankshaft angular velocity. The combustion phasing value is compared to an expected combustion phasing value based on a predetermined start of injection crank angle and combustion phasing differences greater than an allowable combustion phasing difference are identified based on the comparison.

16 Claims, 5 Drawing Sheets

FUEL SYSTEM DIAGNOSTICS BY ANALYZING ENGINE CRANKSHAFT SPEED SIGNAL

TECHNICAL FIELD

This disclosure relates to operation and control of internal combustion engines, including compression-ignition engines.

BACKGROUND

The statements in this section merely provide background information related to the present disclosure and may not constitute prior art.

Combustion timing or phasing is useful to diagnose issues in the combustion process. For a normal combustion process operated under a particular set of parameters, combustion phasing is predictable to within a small range. Combustion cycles deviating from this small range indicate that conditions within the combustion chamber are outside of the expected parameters. Analysis of combustion cycles may be performed in a number of ways.

Known methods to evaluate combustion phasing rely on estimating heat of combustion, the work performed by combustion, or other reactive metrics. These methods review historical data and react to trends or accumulated data points in the combustion data. However, compression-ignition engines and other engine control schemes operate over broad engine conditions. Effective and timely control, including fuel control, fuel tailoring, charge ignition timing control, exhaust gas recirculation (EGR) control, is necessary to meet operator demands for performance and fuel economy and comply with emissions requirements. Furthermore, there is much variability, including that related to: components, e.g., fuel injectors; systems, e.g., fuel line and pressures; operating conditions, e.g., ambient pressures and temperatures; and fuels, e.g., cetane number and alcohol content. The variability in combustion affects heat release and work output from individual cylinders, resulting in non-optimal performance of the engine. A measure of combustion variability based on real-time engine performance would be valuable to diagnose instability in the combustion process and provide information useful to reduce periods of inefficient or high emission operation.

Methods are known for processing complex or noisy signals and reducing them to useful information. One such method includes spectrum analysis through Fast Fourier Transforms (FFT). FFTs reduce a periodic or repeating signal into a sum of harmonic signals useful to transform the signal into the components of its frequency spectrum. Once the components of the signal have been identified, they may be analyzed and information may be taken from the signal.

Change in the engine performance may be apparent in crankshaft speed. A variety of methods are known to measure crankshaft speed. One method utilizes a sensing device in close proximity to a spinning output shaft of the engine. In such known embodiments, the output shaft can be equipped with a target wheel device, indexed in some manner to enable accurate readings of angular velocity of the spinning output shaft. For example, one known embodiment utilizes a metallic wheel with raised indicators in combination with a magnetically sensitive sensor, one index section of the wheel intentionally left without the raised indicators, such that readings from the magnetic sensor clearly measure spinning passage of the raised indicators with a gap in the data stream indicating the passage of the index section. However, many methods are known for measuring the rotational speed of a spinning shaft.

A system capable of transforming signals, such as angular velocity readings from a spinning output shaft, containing information related to combustion into components describing combustion timing in real time would be useful to control sensitive engine control schemes and increase engine efficiency, fuel economy, and emissions control.

SUMMARY

An internal combustion engine includes a crankshaft and a plurality of combustion chambers. A method for diagnosing combustion within the engine includes monitoring crankshaft angular velocity and generating a combustion phasing value for a combustion chamber based on the crankshaft angular velocity. The combustion phasing value is compared to an expected combustion phasing value based on a predetermined start of injection crank angle and combustion phasing differences greater than an allowable combustion phasing difference are identified based on the comparison.

BRIEF DESCRIPTION OF THE DRAWINGS

One or more embodiments will now be described, by way of example, with reference to the accompanying drawings, in which.

DETAILED DESCRIPTION

Figure 1:
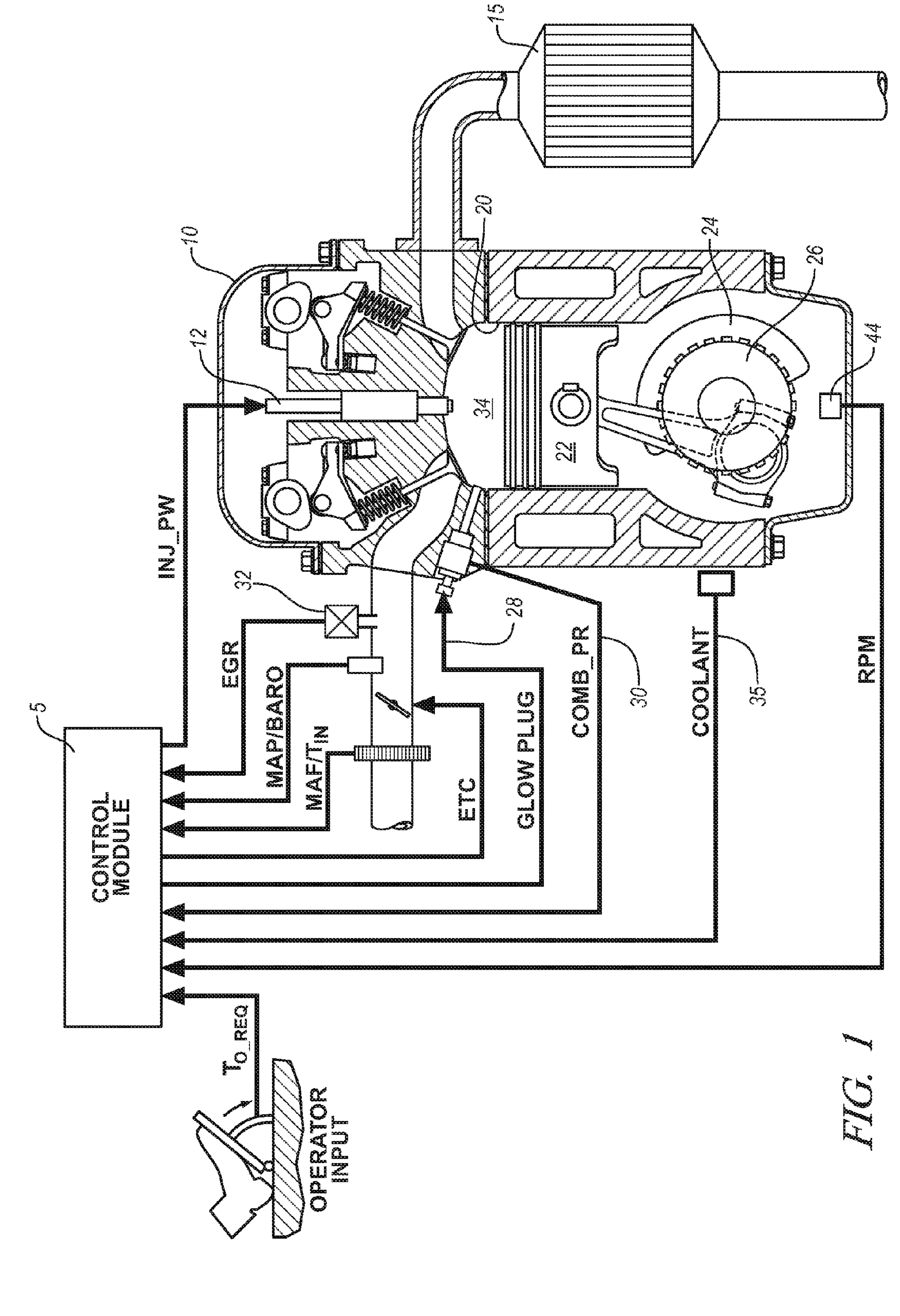
FIG. 1 is a sectional view of an internal combustion engine configured according to an exemplary embodiment of the disclosure.

Referring now to the drawings, wherein the showings are for the purpose of illustrating certain exemplary embodiments only and not for the purpose of limiting the same, FIG. 1 is a schematic diagram depicting an internal combustion engine 10, control module 5, and exhaust aftertreatment system 15, constructed in accordance with an embodiment of the disclosure. The exemplary engine comprises a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request ($T_{O\_REQ}$). The engine preferably employs a four-stroke operation wherein each engine combustion cycle comprises 720 degrees of angular rotation of crankshaft 24 divided into four 180-degree stages (intake-compression-expansion-exhaust), which are descriptive of reciprocating movement of the piston 22 in the engine cylinder 20. A multi-tooth target crank wheel 26 is attached to the crankshaft and rotates therewith. The engine includes sensing devices to monitor engine operation, and actuators which control engine operation. The sensing devices and actuators are signally or operatively connected to control module 5.

The engine preferably comprises a direct-injection, four-stroke, internal combustion engine including a variable volume combustion chamber defined by the piston reciprocating within the cylinder between top-dead-center and bottom-dead-center points and a cylinder head comprising an intake valve and an exhaust valve. The piston reciprocates in repetitive cycles each cycle comprising intake, compression, expansion, and exhaust strokes.

The engine preferably has an air/fuel operating regime that is primarily lean of stoichiometry. One having ordinary skill in the art understands that aspects of the disclosure are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods described herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multiple fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

Sensing devices are installed on or near the engine to monitor physical characteristics and generate signals which are correlatable to engine and ambient parameters. The sensing devices include a crankshaft rotation sensor, comprising a crank sensor 44 for monitoring crankshaft speed (RPM) through sensing edges on the teeth of the crank wheel 26. The crank sensor is known, and may comprise, e.g., a Hall-effect sensor, an inductive sensor, or a magnetoresistive sensor. Signal output from the crank sensor 44 (RPM) is input to the control module 5. There is a combustion pressure sensor 30, comprising a pressure sensing device adapted to monitor in-cylinder pressure (COMB_PR). The combustion pressure sensor 30 preferably comprises a non-intrusive device comprising a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, COMB_PR, of the sensing element of sensor 30 is proportional to cylinder pressure. The sensing element of sensor 30 comprises a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature ($T_{IN}$), and, a coolant sensor 35 (COOLANT). The system may include an exhaust gas sensor (not shown) for monitoring states of one or more exhaust gas parameters, e.g., temperature, air/fuel ratio, and constituents. One having ordinary skill in the art understands that there may other sensing devices and methods for purposes of control and diagnostics. The operator input, in the form of the operator torque request, $T_{O\_REQ}$, is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request ($T_{O\_REQ}$). There is an exhaust gas recirculation valve 32 and cooler (not shown), which controls flow of externally recirculated exhaust gas to the engine intake, in response to a control signal (EGR) from the control module. The glow-plug 28 comprises a known device, installed in each of the combustion chambers, adapted for use with the combustion pressure sensor 30.

The fuel injector 12 is an element of a fuel injection system, which comprises a plurality of high-pressure fuel injector devices each adapted to directly inject a fuel charge, comprising a mass of fuel, into one of the combustion chambers in response to the command signal, INJ_PW, from the control module. Each of the fuel injectors 12 is supplied pressurized fuel from a fuel distribution system (not shown), and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 preferably includes one or more a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event. Event-based algorithms and engine operation include pressure monitoring from the combustion sensor 30, wherein measurements are taken corresponding to each tooth passing on the crank wheel 26. Thus, when the crank wheel comprises a 60×-2× wheel, combustion sensing occurs each six degrees of crankshaft rotation, with one tooth and measurement corresponding to crank setting at 0 TDC for each piston.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request, $To_{REQ}$, and from the sensors indicating the engine speed (RPM) and intake air temperature ($T_{IN}$), and coolant temperature and other ambient conditions.

Figure 2:
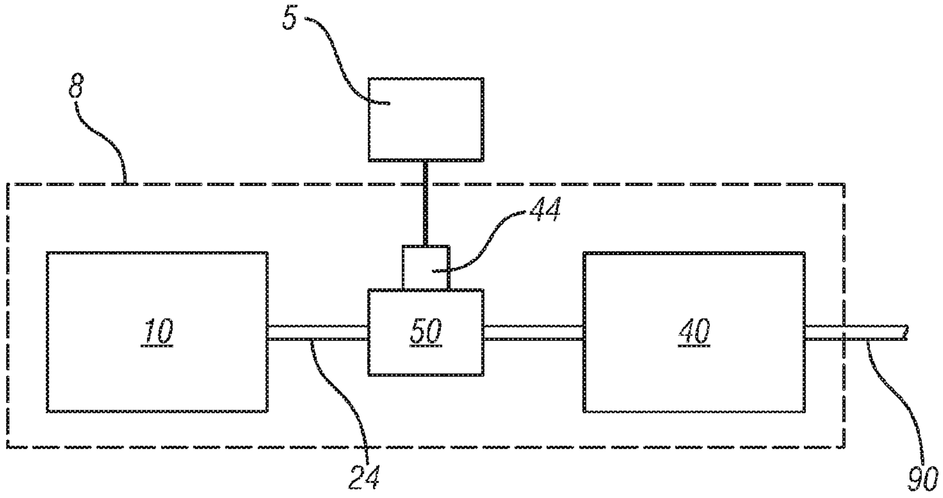
FIG. 2 is a schematic diagram of a powertrain system utilizing a crankshaft speed sensing assembly in accordance with the disclosure.

Referring now to FIG. 2, a powertrain system 8 is illustrated which has been constructed in accordance with an embodiment of the disclosure. The powertrain system 8 includes an engine 10, a crankshaft 24, a transmission assembly 40, a crankshaft speed sensing assembly 50, a crank sensor 44, and an output shaft 90. Crankshaft 24 is a component of engine 10 which acts to transform power from translating piston reciprocating motion in the engine to a spinning output shaft. This embodiment of the disclosure further incorporates a crankshaft speed sensing assembly 50 located inline between engine 10 and transmission assembly 40; however, it should be appreciated that crankshaft speed sensing assembly 50 may be replaced by any device capable of quantifying the rotational position of crankshaft 24 or any attached portion of the drivetrain capable of quantifying engine rotational velocity. Crank sensor 44 is positioned at crankshaft speed sensing assembly 50 such that crank sensor 44 may measure rotational data related to the position of crankshaft 24. Control module 5 is in communication with crank sensor 44 to collect any data gathered by crank sensor 44.

Figure 3:
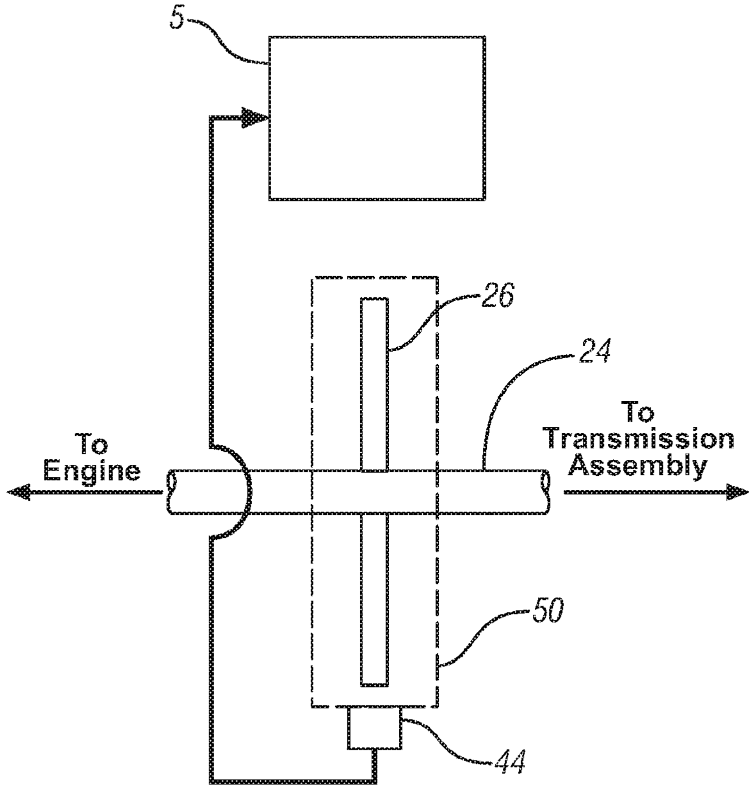
FIG. 3 is a schematic diagram of a crankshaft speed sensing assembly, a crank sensor, and a control module in accordance with the disclosure.

FIG. 3 depicts the interaction between crankshaft speed sensing assembly 50, crank sensor 44, and control module 5 according to an exemplary embodiment of the disclosure. Control module 5 may contain a data processor, or it may simply contain or link to a port by which data may be collected by a device outside the system. In this particular embodiment, any rotation of crankshaft 24 creates a substantially matching or proportional rotation of crank wheel 26.

Crank sensor 44 interacts with crank wheel 26, such that crank sensor 44 may gather detailed data regarding each rotation of crank wheel 26. One known embodiment of crank wheel 26 illustrates the use of a plurality of target wheel raised indicators in conjunction with a magnetic crank sensor 44. As is well known in the art, magnetic sensors may be used to detect a change in metallic mass located proximately to the sensor. As the wheel rotates, each individual raised indicator creates an impulse in crank sensor 44, and that impulse is relayed to control module 5. Crank wheel 26, in one known embodiment, incorporates a blank section where no indications are found. The blank section acts as a rotational index, such that any subsequent processing of the data collected may distinguish between particular impulses. As aforementioned, the crankshaft speed sensing assembly 50 is connected to the crankshaft 24 so that any rotation of crankshaft 24 creates a substantially matching or proportional rotation of crank wheel 26. In one known embodiment, crank wheel 26 of the crankshaft speed sensing assembly 50 includes a blank section correlates to an index cylinder of engine 10 being in top dead center position. As crank wheel 26 rotates past the blank section, engine control features may time engine functions to subsequent rotation readings relative to the known position of the blank section and hence the top dead center position of the index cylinder of the engine. Functions which may be calibrated to known cylinder locations include valve timing, spark timing, and fuel injector timing. While this preferred embodiment is described utilizing raised indicators, many different forms of indication could be used, including depressions in place of the raised indicators, notches cut in place of the raised indicators, optically recognizable stripes or other patterns, or any other form of indication which could be translated into a data stream from a spinning wheel or shaft.

As the timing of an index cylinder may be correlated to the crank wheel 26, so too can the timing of the remaining cylinders. A plurality of crankshaft positions may be used in connection to individual raised indicators and correlated to the known timing of the multiple cylinders of engine 10. In this way, the crankshaft speed sensing assembly 50 may be used in the control of cylinder to cylinder engine functions.

Combustion occurring within the engine is difficult to directly monitor. Sensors may detect and measure fuel flow and air flow into the cylinder, a sensor may monitor a particular voltage being applied to a spark plug, input values such as programmed start of injection (SOI) or programmed ignition timing may be known, or a processor may gather a sum of information that would predict conditions necessary to generate an auto-ignition. However, these readings and data point together are merely predictive of combustion and do not measure actual combustion results. As mentioned above, methods are known for measuring crankshaft speed. In the exemplary embodiment described above, a multi-tooth crank wheel 26 is attached to the crankshaft and rotates therewith. Signals provided to control module 5 from crank wheel 26 provide detailed information about the crankshaft attached to a piston within each cylinder of the engine. As mentioned above, crankshaft speed changes as a result of combustion cycles and associated expansion strokes within the engine. Small changes to the combustion cycle within an individual cylinder will alter the acceleration of the piston, impacting the crankshaft speed apparent in the signal received by control module 5. For example, a partial cylinder misfire can result in a combustion cycle with delayed timing. This delayed timing will result in a measurable change to the crankshaft speed as compared to an expected crankshaft speed. Crankshaft speed therefore contains direct information describing the combustion cycles, including combustion phasing information. Combustion of a known charge at known timing under known conditions produces a predictable result within the cylinder. Based upon an understanding of the combustion process and the effects of different input on combustion phasing, crankshaft speeds may be analyzed to evaluate combustion within a particular cylinder. By estimating the state of the combustion process for a cylinder and comparing the state to expected cylinder readings, cylinders may be evaluated in terms of malfunctions, misfires, or inefficient operation. Such evaluations may be especially important in engines operating under homogeneous charge compression ignition (HCCI), compression ignition such as is implemented in diesel applications, or other auto-ignition schemes, as small variations in cylinder conditions can interfere with conditions necessary to create efficient and orderly auto-ignition necessary to derive the benefits of efficiency, fuel economy, and low emissions evident in a properly functioning engine.

Figure 4:
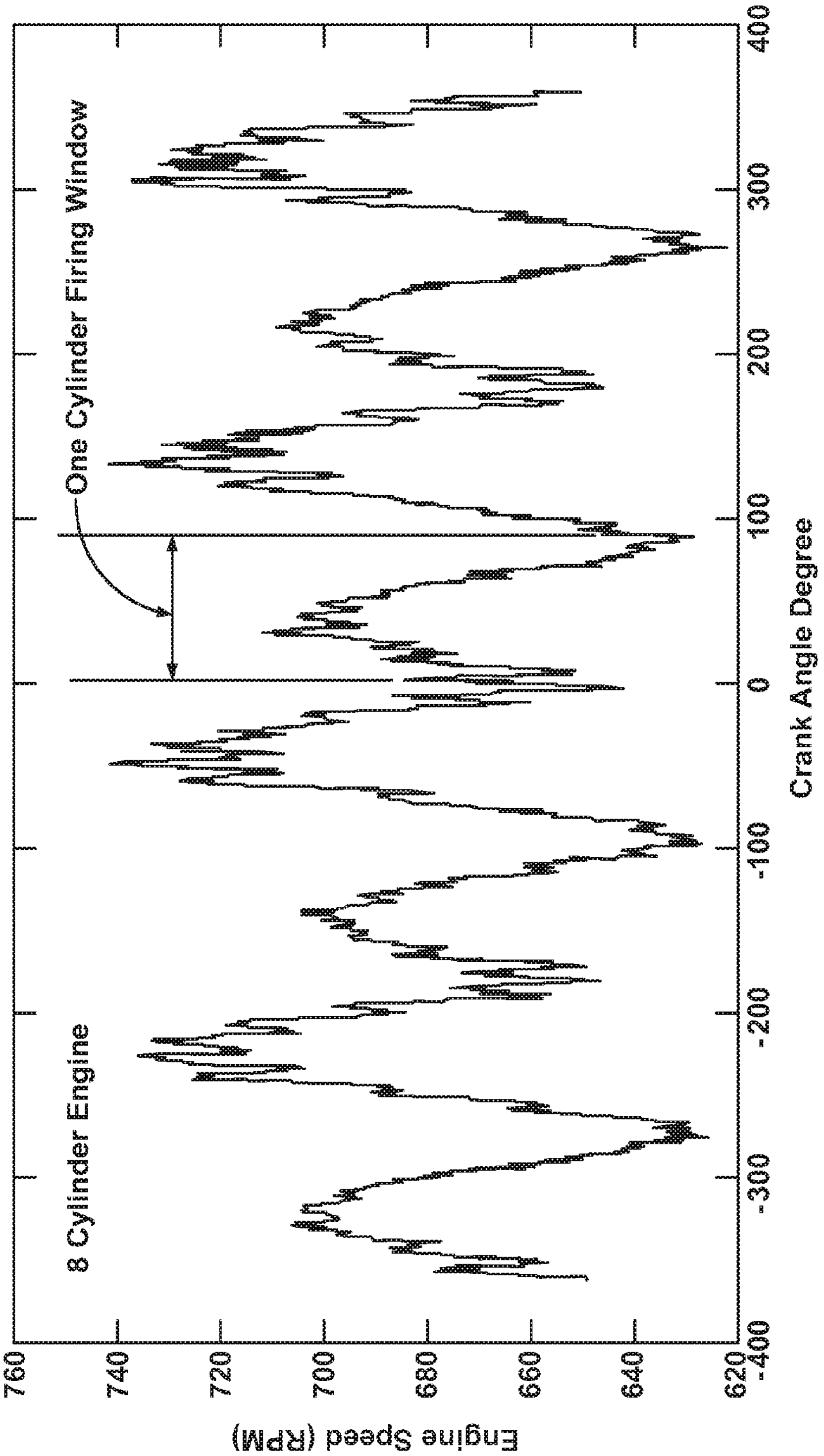
FIG. 4 is a graphical depiction of exemplary crankshaft speeds observable during a series of combustion cycles within a multi-cylinder engine in accordance with the disclosure.

Sensor readings related to crankshaft operation contain information directly related to the combustion occurring within the combustion chamber. As each cylinder fires, the expansion stroke of the piston drives the crankshaft, increasing the crankshaft speed or creating angular acceleration. When no expansion stroke is operating on the pistons of the engine, the crankshaft slows as a result of losses associated with friction, load, etc. Steady, average engine speed conditions where the net average speed of the crankshaft over a time period remains constant describe a situation where the increases in speed caused by the expansion strokes match the decreases in speed experienced outside of the expansion strokes. In an ideal, theoretical model of the engine, the angular velocity of the crankshaft could thusly be profiled in a smooth up and down pattern coinciding with the combustion cycles occurring within the engine. However, engines are complex mechanisms, and crankshaft speed readings contain, in addition to a measure of the combustion cycles, a multitude of crankshaft speed oscillations from other sources. FIG. 4 illustrates crankshaft speed readings from a crankshaft speed sensor in an exemplary eight cylinder engine in accordance with the disclosure. As can be seen in the data plot, an overall cyclic up and down pattern can be identified. This overall pattern is associated with the aforementioned effects of the combustion cycles within the engine. The minor fluctuations in the plot indicated by the jerky up and down patterns in the overall wave pattern represent oscillations caused by forces other than the expansion strokes. A number of methods exist in the art for filtering noisy data into useful information. For example, Fast Fourier Transforms (FFTs) are mathematical methods well known in the art. One FFT method known as spectrum analysis analyzes a complex signal and separates the signal into its component parts which may be represented as a sum of harmonics. Spectrum analysis of a crankshaft speed signal represented by f(θ) may be represented as follows:

$$FFT(f(\theta))=A_0+(A_1\sin(\omega_0\theta+\phi_1))+(A_2\sin(2\omega_0\theta+\phi_2))+\ldots+(A_N\sin(N\omega_0\theta+\phi_N)) \quad [1]$$

Each component N of the signal f(θ) represents a periodic input on the speed of the crankshaft, each increasing increment of N including signals of higher frequency. Experimental analysis has shown that the speed oscillation caused by combustion and the piston moving through the various stages of the combustion cycle tends to be the first, lowest frequency harmonic. By isolating this first harmonic signal, crankshaft speed oscillations due to combustion can be measured and evaluated. As is well known in the art, FFTs provide information regarding the magnitude and phase of each identified harmonic, captured as the $\phi$ term in each harmonic of the above equation. The angle of the first harmonic, or $\phi_1$, is, therefore, the dominant term tracking combustion phasing information. By analyzing the component of the FFT output related to crankshaft speed attributable to combustion, the phasing information of this component can be quantified and compared to either expected phasing or the phasing of other cylinders. This comparison allows for the measured phasing values to be evaluated and a warning indicated if the difference is greater than a threshold phasing difference, indicating combustion issues in that cylinder.

Signals analyzed through FFTs are most efficiently estimated when the input signal is at steady state. Transient effects of a changing input signal can create errors in the estimations performed. While methods are known to compensate for the effects of transient input signals, the methods disclosed herein are best performed at either idle or steady, average engine speed conditions in which the effects of transients are substantially eliminated. One known method to accomplish the test in an acceptably steady test period is to take samples at a test interval and utilize an algorithm within the control module to either validate or disqualify the test data as being taken during a steady period of engine operation.

It should be noted that although the test data is preferably taken at idle or steady engine operation, information derived from these analyses can be utilized by complex algorithms or engine models to effect more accurate engine control throughout various ranges of engine operation. For example, if testing and analysis at idle shows that cylinder number four has a partially clogged injector, fuel injection timing could be modified for this cylinder throughout different ranges of operation to compensate for the perceived issue.

Figure 5:
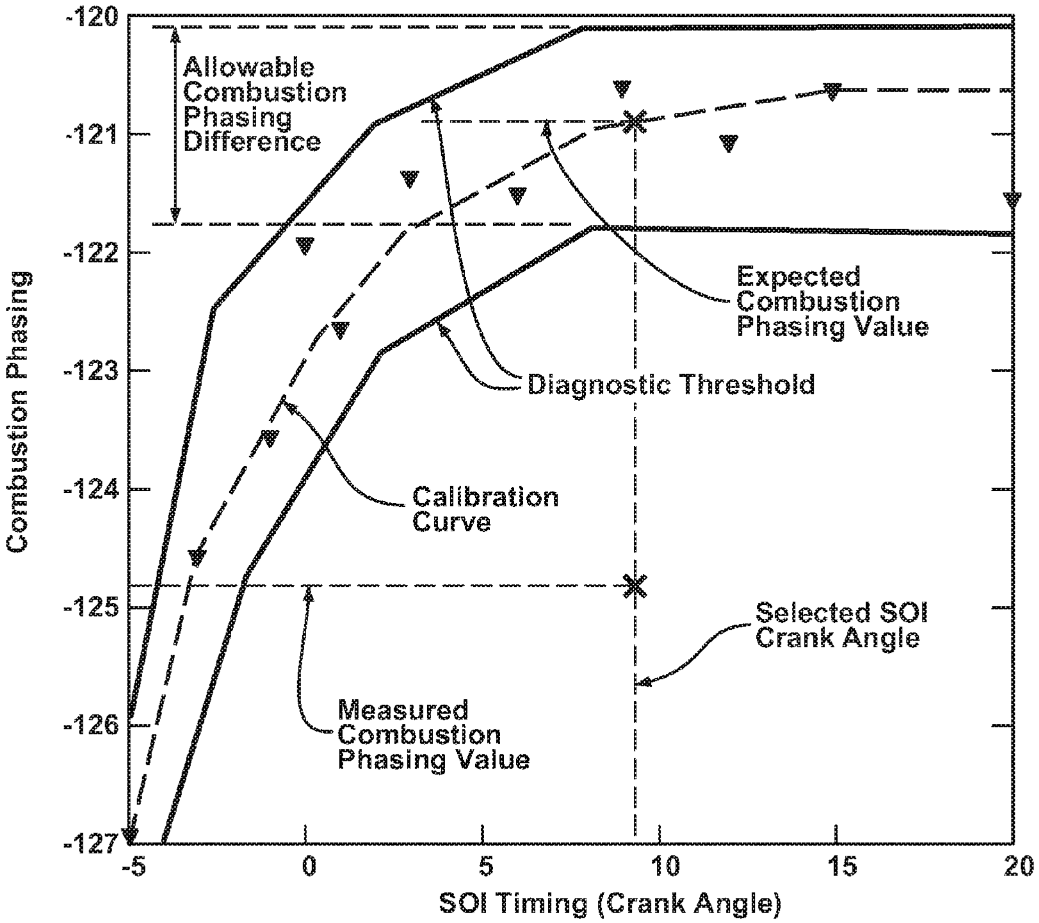
FIG. 5 is a graphical depiction of an exemplary combustion phasing calibration curve, displaying SOI crank angles, resulting combustion phasing values, and an exemplary method to evaluate measured combustion phasing values, in accordance with the disclosure.

FIG. 5 demonstrates a calibration curve, depicting SOI values versus resulting expected crankshaft speed phasing values in accordance with the disclosure. Such a curve may be developed experimentally, empirically, predictively, through modeling or other techniques adequate to accurately predict engine operation, and a multitude of calibration curves might be used by the same engine for each cylinder and for different engine settings, conditions, or operating ranges. For any selected SOI crank angle value, points are plotted giving expected crankshaft speed phasing values. This calibration curve is useful in coordination with some defined tolerance to judge whether measured crankshaft speed phasing for a selected or programmed SOI value in the engine controller is within normal operation tolerances for the current combustion cycle.

Different embodiments of comparisons of measured values to expected values in order to evaluate combustion phasing may be performed in accordance with the disclosure. Different embodiments of comparisons of measured values to expected values may be performed utilizing engine calibration data illustrated in the graph of FIG. 5. Methods contemplated include fixing one of SOI timing or combustion phasing and evaluating measured values of the other term versus expected values from the graph. In the exemplary curve displayed in FIG. 5, a comparison is defined wherein a selected SOI timing crank angle is measured from the operation of the engine, in this exemplary graph, for instance, at 9.5 degrees. Using the calibration curve, a selected combustion phasing value is estimated and compared to a measured combustion phasing value acquired from analysis of crankshaft speed data. From the calibration curve on this exemplary graph, a selected combustion phasing value of minus 120.8 is estimated. Analysis of the crankshaft speed data has yielded a measured combustion phasing value of minus 124.8. An allowable combustion phasing difference for this SOI timing is defined as plus 0.6 and minus 0.9. The selected combustion phasing value is compared to the measured combustion phasing value, and a warning is generated if the measured combustion phasing value differs from the selected combustion phasing value by more than the allowable difference. In this exemplary graph, the measured combustion phasing value differs from the selected combustion phasing value by more than the allowable difference, so a warning indication is appropriate. The allowable combustion phasing difference may be the same value in the positive and negative, or as in this exemplary graph, the values may differ for values greater and less than the expected combustion phasing value. Additionally, different allowable combustion phasing differences may be defined for different SOI timing ranges or specific values. Additionally the allowable combustion phasing differences may modulate based upon other engine conditions or measured parameters. For example, an engine operating under spark-assist ignition may have different allowable combustion phasing differences than an engine operating under compression ignition. Allowable combustion phasing difference values may be collectively described across various SOI timing crank angles, as in FIG. 5, as a band of diagnostic thresholds.

Many factors are utilized to select the allowable combustion phasing difference values. The range of values allowable must be large enough to allow for normal deviation in combustion phasing resulting from normal variations in engine operation, resulting from changing conditions such as temperature, fuel type, vehicle maintenance history, and changes in throttle setting or vehicle load. However, the range of values allowable must be small enough to identify significant cylinder malfunctions. Although testing is preferably performed at idle or steady engine operation, use in transient conditions can be accomplished by adding some modifier or applying an algorithm to the allowable combustion phasing difference values to accommodate changes expected in the transition. For example, if acceleration by a particular increase in throttle in a certain zone of engine operation is known to command a certain SOI timing, anticipation of the engine operating in this zone based upon current conditions, historical driver habits (for example, if the driver frequently accelerates at a particular point on the road), GPS information, etc. could be used to adjust allowable combustion phasing difference values to compensate. The range of allowable combustion phasing difference values in any method utilized will differ from application to application and may be determined experimentally, empirically, predictively, through modeling or other techniques adequate to accurately predict engine operation.

Figure 6:
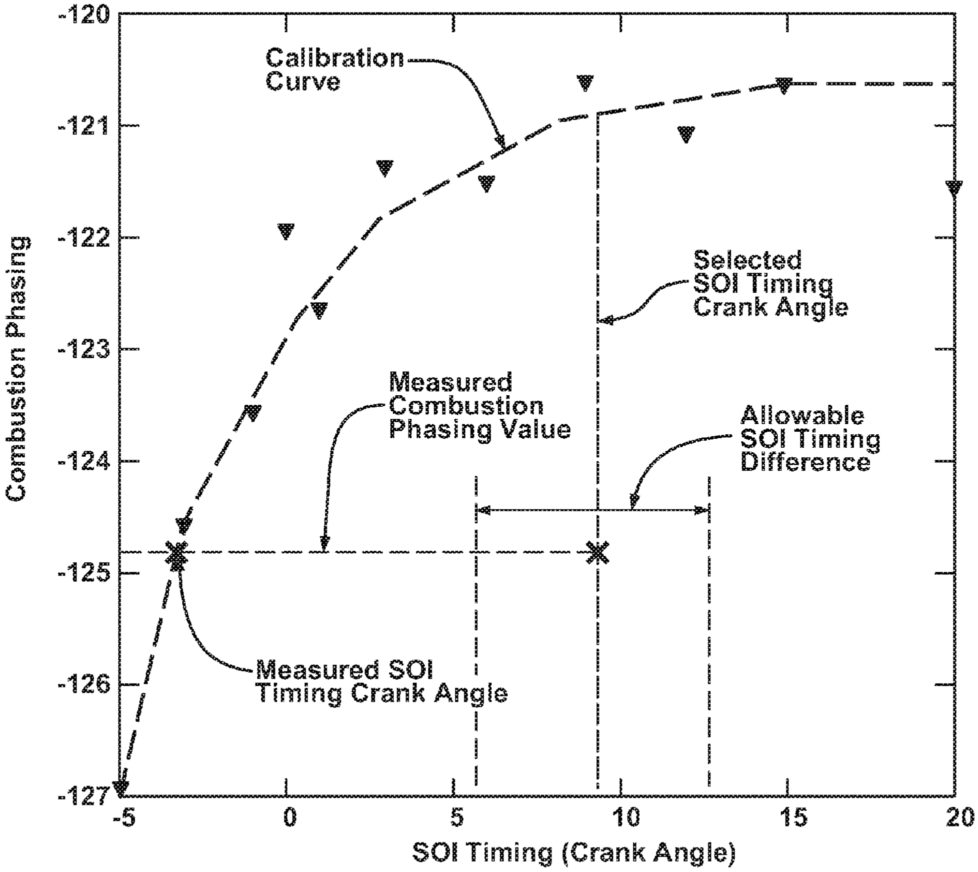
FIG. 6 is a graphical depiction of an exemplary combustion phasing calibration curve, displaying SOI crank angles, resulting combustion phasing values, and an exemplary method to evaluate measured SOI timing crank angles, in accordance with the disclosure.

As mentioned above, the aforementioned methodology of selecting an SOI timing crank angle and comparing combustion phasing values may be reversed, and a selected or set SOI timing crank angle may be compared to a measured or projected SOI timing crank angle. Referencing FIG. 6, a selected SOI timing crank angle is defined according to current engine settings. A measured combustion phasing value is acquired from analysis of crankshaft speed data. From this measured combustion phasing value, a measured SOI timing crank angle is developed based upon the calibration curve. The selected SOI timing crank angle is compared to the measured SOI timing crank angle, and a warning is generated if the measured SOI timing crank angle differs from the selected SOI timing crank angle by more than an allowable difference. In the exemplary graph of FIG. 6, a selected SOI timing crank angle is defined at 9.5 degrees. A measured combustion phasing value is acquired at minus 124.8. This measured combustion phasing value yields a measured SOI timing crank angle of minus three degrees. An allowable SOI timing difference is defined at plus and minus 3.5 degrees. In this exemplary graph, the measured SOI timing crank angle differs from the selected SOI timing crank angle by more than the allowable difference, so a warning indication is appropriate. As discussed above with regard to the allowable combustion phasing difference, the allowable SOI timing difference can vary from application to application and across different operating ranges and operating conditions, and is not intended to be limited to the specific embodiments illustrated herein.

Warnings issued due to an identified combustion issue or faulty cylinder conditions may take many forms, including but not limited to a warning light indication, an audible tone or message, a display on a driver interface device, or a message relayed over a communications network. Alternatively, error messages or fault tallies not deemed to be critical could be recorded in a memory storage device, preferably communicably connected to or unitary with the above mentioned control module 5, for review by maintenance personnel without alerting the driver.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for diagnosing combustion within an internal combustion engine including a crankshaft and a plurality of combustion chambers, comprising:

monitoring crankshaft angular velocity;

generating a combustion phasing value for a combustion chamber based on said crankshaft angular velocity;

comparing said combustion phasing value to an expected combustion phasing value based on a predetermined start of injection crank angle; and identifying combustion phasing differences greater than an allowable combustion phasing difference based on said comparing.

2. The method of claim 1, wherein generating a combustion phasing value comprises a Fast Fourier Transform of said crankshaft angular velocity.

3. The method of claim 2, wherein generating a combustion phasing value comprises employing said Fast Fourier Transform to identify a waveform including a first harmonic waveform associated with a combustion cycle.

4. The method of claim 1, wherein said monitoring crankshaft angular velocity comprises monitoring crankshaft angular velocity during engine idle conditions.

5. The method of claim 1, wherein said monitoring crankshaft angular velocity comprises monitoring crankshaft angular velocity during steady average engine speed conditions.

6. The method of claim 5, wherein monitoring crankshaft angular velocity during steady average engine speed conditions comprises monitoring crankshaft angular velocity at a test interval and validating said test interval as steady average engine speed conditions.

7. A method for diagnosing combustion within an internal combustion engine including a crankshaft and a plurality of combustion chambers, comprising:

monitoring crankshaft angular velocity;

generating a combustion phasing value for a combustion chamber based on said crankshaft angular velocity;

estimating a start of injection crank angle based on said combustion phasing value;

comparing said start of injection crank angle to a predetermined start of injection crank angle; and identifying start of injection crank angle differences greater than an allowable start of injection crank angle difference based on said comparing.

8. The method of claim 7, wherein generating a combustion phasing value for a combustion chamber based on said crankshaft angular velocity comprises utilizing a Fast Fourier Transform to identify a waveform comprising a first harmonic waveform associated with a combustion cycle.

9. The method of claim 7, wherein said monitoring crankshaft angular velocity comprises monitoring crankshaft angular velocity during engine idle conditions.

10. The method of claim 7, wherein said monitoring crankshaft angular velocity comprises monitoring crankshaft angular velocity during steady average engine speed conditions.

11. An apparatus for diagnosing combustion within an engine comprising:

an engine including a variable volume combustion chamber defined by a piston reciprocating within a cylinder between top-dead-center and bottom-dead-center points and a cylinder head;

an engine speed sensor generating engine speed data comprising crankshaft angular velocity; and a control module configured for monitoring said engine speed data, generating a combustion phasing value for said cylinder based on said engine speed data, comparing said combustion phasing value to an expected combustion phasing value based on a predetermined start of injection crank angle, and identifying combustion phasing value differences greater than an allowable combustion phasing value difference based on said comparing.

12. The apparatus of claim 11, wherein said engine comprises a direct-injection engine operative lean of stoichiometry.

13. The apparatus of claim 11, wherein said control module utilizes a Fast Fourier Transform of said engine speed data to generate said measured combustion phasing value.

14. The apparatus of claim 13, wherein said Fast Fourier Transform operates upon said engine speed data to identify a waveform comprising a first harmonic waveform associated with a combustion cycle.

15. The apparatus of claim 11, wherein said control module monitoring said engine speed data comprises analyzing said engine speed data to identify an interval of idle operation.

16. The apparatus of claim 11, wherein said control module monitoring said engine speed data comprises analyzing said engine speed data to identify an interval of steady average engine speed conditions.

* * * * *